United States Patent
Kondo et al.

[11] Patent Number: 6,136,409
[45] Date of Patent: *Oct. 24, 2000

[54] NONWOVEN FABRIC, FILTER MEDIUM AND PROCESS FOR PRODUCING THE SAME

[75] Inventors: Goro Kondo; Katsutoshi Ando, both of Otsu; Koji Sugano, Mishima, all of Japan

[73] Assignee: Toray Industries, Inc., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/699,472

[22] Filed: Aug. 19, 1996

[51] Int. Cl.⁷ ........................................ B32B 5/12

[52] U.S. Cl. ........................ 428/114; 428/181; 442/381; 442/400

[58] Field of Search ............................ 156/62.4; 442/334, 442/381, 400; 428/114, 181

[56] References Cited

U.S. PATENT DOCUMENTS

| | | | |
|---|---|---|---|
| 4,107,374 | 8/1978 | Kusunose et al. | 428/288 |
| 4,707,269 | 11/1987 | Ohue et al. . | |
| 5,286,553 | 2/1994 | Haraguchi et al. | 428/233 |
| 5,419,953 | 5/1995 | Chapman . | |

FOREIGN PATENT DOCUMENTS

| | | |
|---|---|---|
| 0123545 A2 | 10/1984 | European Pat. Off. . |
| 53-38767 | 4/1978 | Japan . |
| 53-105573 | 9/1978 | Japan . |
| 2-269859 | 11/1990 | Japan . |
| 3-64565 | 3/1991 | Japan . |
| 4-161209 | 6/1992 | Japan . |
| 7-003604 | 1/1995 | Japan . |
| 1707109 A1 | 1/1992 | U.S.S.R. . |

*Primary Examiner*—Christopher Raimund
*Attorney, Agent, or Firm*—Austin R. Miller

[57] ABSTRACT

A nonwoven fabric comprising thermoplastic resin fiber bundles, wherein numerically at least about 50% of all the fibers present are bonded to each other in the form of fiber bundles. The fiber bundles are arranged along substantially one direction.

9 Claims, 3 Drawing Sheets

NONWOVEN FABRIC, FILTER MEDIUM AND PROCESS FOR PRODUCING THE SAME

BACKGROUND OF THE INVENTION

The present invention relates to a nonwoven fabric having excellent foldability and excellent stiffness, to a filter medium made thereof, and to a process for producing the fabric and filter medium.

DESCRIPTION OF THE RELATED ART

Nonwoven fabrics are in general use as a filter media. They need to provide good foldability and stiffness when incorporated into filtration devices. When a filter medium is used in pleated form for use in an air filter, it needs good foldability and stiffness to resist deformation under air pressure. On the other hand, a filter medium needs to be able to collect particles, which can often be done by various nonwoven fabrics made of fine fibers. However, they suffer from inadequate foldability and insufficient stiffness if used alone.

A nonwoven fabric of uniform structure composed of fine fibers can be obtained by melt-blowing. It may be further processed to the form of an electret by imparting electrostatic properties. The resulting nonwoven electret fabric has improved particle collecting ability due to electrostatic attraction without increasing pressure drop through the fabric. However, being composed of unoriented fibers, the conventional melt-blown nonwoven fabrics suffer the disadvantage of being weaker than nonwoven fabrics composed of oriented fibers. Therefore, they tend to rupture during folding and to deform under air pressure during use, thereby causing a pressure drop.

There are several known means to impart stiffness to nonwoven fabrics, e.g. (1) by using a large amount of resin for fiber-to-fiber bonding, (2) by increasing their density by calendaring, (3) by forming the fabrics from thick fibers, and/or (4) by increasing their weight per square meter. However, the resulting nonwoven fabrics suffer various disadvantages when used as filter media: (1) a large amount of bonding resin increases air flow resistance, (2) a calendaring step presses the fibers and narrows the interstices between the fibers and hence increases air flow pressure drop, (3) thick fibers form large interstices between fibers, and this impairs particle collection capability, (4) increasing weight results in excessive thickness of nonwoven fabric and impairs foldability.

In the production of nonwoven fabrics it has been regarded as important to separate individual fibers from one another, and efforts have been made in the art to achieve this objective. In other words, opening individual fibers, thereby dispersing them, has always been an important factor in the production of nonwoven fabrics not only from staple fibers by carding, but also from filaments by spunbonding or from filaments by melt-blowing.

A nonwoven fabric in which individual fibers are uniformly dispersed lacks the stiffness required of filter media. That is, simply dispersed and interlaced single fibers do not provide a large degree of stiffness because each length of fiber between fixed points is not strong enough to function well as a support. If thicker fibers are used to cope with this situation, the result is poor particle collection capability. In other words, it is difficult in conventional nonwoven fabric to obtain both excellent stiffness and good particle collection capability at the same time.

Japanese Patent Application Laid-open Nos. SHO-53-38767 (1978), HEI-2-269859 (1990), HEI-3-64565 (1991) and HEI-4-161209 (1992) discloses a nonwoven fabric in which the fibers are arranged in one direction. However, nothing is mentioned about providing sufficient stiffness for use as a filter medium, especially a pleated filter medium.

Japanese Patent Application Laid-open No. SHO-53-105573 (1978) discloses a process of producing a laminate by press-bonding nonwoven fabrics. However, there is no disclosure of lamination of nonwoven fabrics having sufficient stiffness.

SUMMARY OF THE INVENTION

It is an object of the present invention to provide a nonwoven fabric which is free of the foregoing shortcomings and has excellent foldability and stiffness.

It is another object of the present invention to provide a filter medium which has excellent foldability and stiffness as well as effective particle collecting capability.

It is further another object of the present invention to provide a process for producing such a nonwoven fabric and filter medium.

It is important in accordance with the present invention to provide a nonwoven fabric comprising numerically at least about 50% of all the fibers in the form of bound fiber bundles comprising a plurality of individual fibers bound together by thermoplastic resin, wherein the fiber bundles are caused to extend substantially in the same direction.

Fiber bundles formed from individual fibers constituting a nonwoven fabric can impart to the nonwoven fabric an excellent particle collecting capability due to the presence of individual fibers. They also have excellent stiffness due to the substantially unidirectional configuration of bundles. In addition, arranging the fiber bundles substantially in one direction provides excellent foldability of the nonwoven fabric when it is folded along a line substantially perpendicular to the direction of arrangement.

The present invention enables creation of a filter medium comprising a laminate formed by combining the new nonwoven fabric with an air permeable fibrous sheet having an air permeability at least about 5 $cc/cm^2/sec$. This filter medium exhibits improved particle collecting ability in addition to the other beneficial characteristics of the nonwoven fabric, owing to the combination (by lamination) with the air permeable fibrous sheet.

The present invention also relates to a filtering device which employs the above-mentioned nonwoven fabric or filter medium in a pleated form.

The present invention is further directed to a process for producing a nonwoven fabric comprising the steps of: moving a molten thermoplastic resin through a spinneret having holes arranged at intervals not greater than about 1.0 mm at a throughput not less than about 0.5 gram per hole per minute, thereby flowing melt-blown fibers to a collecting drum, and collecting the melt-blown fibers on the collecting drum in such a manner that the direction of the center line of the flow of melt-blown fibers is inclined in the range of about 10–30 degrees with respect to the orientation axis of the spinneret. Accordingly, the center line of the flow of melt-blown fibers approaches the collecting drum at an angle in the range of about 5–20 degrees with respect to a tangent line to the collecting drum at a point where the center line of the flow of melt-blown fibers intersects the collecting drum.

In the process for producing a filter medium wherein a molten thermoplastic resin is passed through a spinneret having holes arranged at intervals not greater than about 1.0 mm at a throughput not less than about 0.5 gram per hole per minute, thereby flowing to a collecting drum, an air permeable fibrous sheet having an air permeability not smaller than 5 cc/cm$^2$/sec may be fed concurrently to the collecting drum. The melt-blown fibers may be collected upon the air permeable fibrous sheet in such a manner that the direction of the center line of the flow of melt-blown fibers is inclined in a range of about 10–30 degrees with respect to the axis of the spinneret and the center line of the flow of melt-blown fibers makes an angle in a range of about 5–20 degrees with a line tangent to the collecting drum at a point where the center line of the flow of melt-blown fibers intersects the collecting drum.

The spinneret and throughput as specified above cause the melt-blown individual fibers to be formed into bundles and to solidify in fixed positions after emergence from the spinneret and while flying through the air. The angular flow of melt-blown fibers promotes the bonding of individual fibers. In addition, directing the melt-blown fibers at an angle to the tangent at the rotating surface of the collecting drum causes the fiber bundles to be arranged substantially in one direction on the nonwoven fabric or filter medium.

Although this invention will now be described with reference to specific examples as shown in the drawings, and although specific terms will be used in the specification in describing those examples, the use of those specific terms is not intended to define or to limit the scope of the invention, which is defined in the appended claims.

DESCRIPTION OF THE PREFERRED EMBODIMENTS

Figure 1:
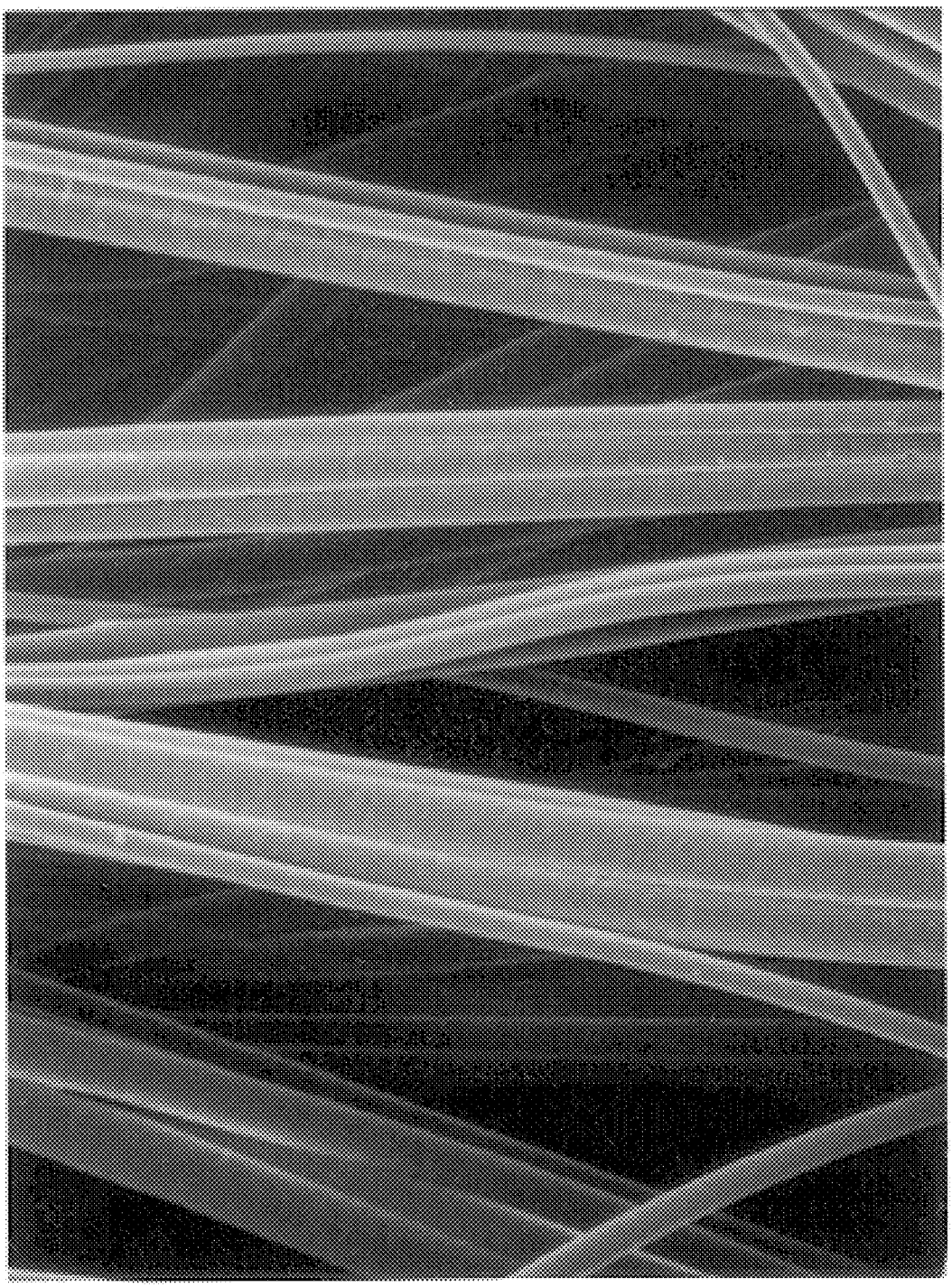
FIG. 1 is a scanning electron microscope photograph showing an essential part of one form of nonwoven fabric embodying features of the present invention.

As shown under magnification in FIG. 1 the nonwoven fabric of this embodiment according to the present invention is composed substantially of fiber bundles. Each of the fiber bundles is formed from a plurality of individual fibers bonded together. Moreover, the individual fibers are arranged substantially in one direction with respect to each other in each bundle, and each bundle is arranged generally parallel to the sheet machine direction.

According to the present invention, the fiber bundles account for at least about 50%, preferably at least about 75%, of all the fibers constituting the nonwoven fabric. In addition, the individual fibers constituting the nonwoven fabric may be either filaments or staple fibers. Each fiber bundle preferably has about 2–20 individual fibers and an average of about 8–12 individual fibers. If the number of individual fibers per bundle exceeds about 20, the resulting nonwoven fabric has good stiffness but poor foldability because the fiber bundles tend to become excessively thick.

The fiber bundle is formed by bonding individual fibers together. This bonding is preferably accomplished by self-bonding in a molten state, or may be achieved with the aid of an adequate adhesive. How individual fibers are bonded in each fiber bundle and how many individual fibers constitute the fiber bundle in any particular case may be easily observed on the fabric surface and its cross section under a scanning electron microscope.

Many of the fiber bundles which form a nonwoven fabric of the present invention are arranged substantially in one direction, preferably in one direction substantially parallel to the sheet machine direction, as contrasted to being dispersed randomly. The expression "sheet machine direction" means the direction in which the sheet of nonwoven fabric is taken up during the production process.

The nonwoven fabric of the present invention does not necessarily require uniform stiffness in all directions, but usually needs stiffness only along the sheet machine direction. This is because the fabric is usually satisfactory for use as a filter medium if it exhibits excellent stiffness along a direction perpendicular to a pleat or pleats in the fabric, which bear a heavy load during pleating and/or in filtration use.

The nonwoven fabric of the present invention comprises fiber bundles wherein the bundles themselves are arranged substantially in the same direction, preferably generally parallel to the running direction of the sheet machine, and hence it exhibits excellent stiffness in that direction. Therefore, if the fabric is pleated such that a pleat intersects substantially at right angles the direction in which the fiber bundles are arranged, the resulting pleated nonwoven fabric resists deformation under air pressure and minimizes pressure loss. In addition, the fiber bundles arranged generally in a single direction impart a smooth surface to the nonwoven fabric and the smooth surface prevents fuzzing and rupture by friction with pleating blades or the like, and facilitates uniform, sharp pleating.

The direction of arrangement of the fiber bundles is preferably within a range of about ±35 degrees, more preferably within a range of about ±30 degrees, with respect to the sheet machine direction. With a greater angle the nonwoven fabric has unsatisfactory foldability and stiffness.

The direction of arrangement and the foregoing angles were determined by observing the surface of the nonwoven fabric under a scanning electron microscope whose field of view was large enough to cover a length equal to about 20–30 times the average fiber diameter. The result is expressed in terms of an average of 100 angles, each between the center line of a randomly selected fiber bundle and the sheet machine direction.

Each individual fiber forming the fiber bundle preferably has an average diameter of equal to but not smaller than about 10 μm and not larger than about 50 μm, more preferably larger than about 10 μm and up to about 30 μm. With an average diameter smaller than about 10 μm, the fiber is so thin that the resulting nonwoven fabric has poor foldability and stiffness, although it is superior in particle collecting performance. Conversely, with an average diameter larger than about 50 μm, the fiber is so thick that the resulting nonwoven fabric tends to rupture during pleating and has poor particle collecting performance.

The nonwoven fabric of the present invention preferably has a weight of about 40–150 g/m$^2$, more preferably about 60–150 g/m$^2$. With a weight smaller than about 40 g/m$^2$, the nonwoven fabric does not have the good stiffness required of the filter medium. Conversely, with a weight larger than about 150 g/m², the nonwoven fabric has poor foldability due to its excessive thickness.

The nonwoven fabric of the present invention may comprise either staple fibers or filaments. It is preferably a melt-blown nonwoven fabric which permits individual fibers to undergo self-bonding in a molten state in the fiber bundle when the nonwoven fabric is formed. The nature of the thermoplastic resin (or raw material) from which the fibers are produced is not specifically restricted so long as it is a polymer capable of being spun. A polyolefin resin, particularly polypropylene, is preferable from the standpoint of spinnability.

Since the nonwoven fabric of the present invention is superior in foldability and stiffness as mentioned above, it has been found to exhibit excellent performance even when it is used alone as a filter medium. It may also be used as a laminate with an air permeable fibrous sheet composed of fine fibers, and the laminate functions as a filter medium having further excellent particle collecting performance.

In other words, it is possible to greatly improve the nonwoven fabric in particle collecting performance, foldability and stiffness by making it into a laminate of composite structure. It is important to emphasize that the resulting laminate as a filter medium has a very long life because the nonwoven fabric comprising fiber bundles functions as a "prefilter" which collects large particles and minimizes wear.

The air permeable fibrous sheet to be combined with the nonwoven fabric should have an air permeability not less than about 5 cc/cm²/sec, preferably not less than about 20 cc/cm²/sec, with the upper limit preferably being about 500 cc/cm²/sec. An excessively high permeability has an adverse effect on particle collecting performance. It is further more preferably in the range of about 40–400 cc/cm²/sec. The fiber forming the air permeable fibrous sheet preferably has an individual fiber fineness of an average diameter not larger than about 10 µm so that it exhibits the desired collecting performance.

The air permeable fibrous sheet may be of a single-layer structure or a laminate composite structure. In addition, it should preferably be a nonwoven fabric of staple fibers or filaments, especially those formed by melt-blowing which yield uniform sheets of fine fibers.

The product may be produced from any polymer capable of spinning. A preferred polymer is a polyolefin resin, particularly polypropylene.

The air permeable fibrous sheet is preferably used in the form of electrostatically treated nonwoven fabric, so that it exhibits a better particle collecting performance with a lower pressure loss owing to electrostatic attraction. It may be in the form of an electret or permanently polarized dielectric material produced by heating the material and placing it in a strong electric field during cooling. Such treatment can be accomplished by any known process, such as application of a high DC voltage for corona discharge on the fibrous sheet. It may be carried out once before or after or twice before and after lamination with the nonwoven fabric comprising fiber bundles.

The combination of the nonwoven fabric and permeable fibrous sheet should be made with a bond strength sufficient to prevent separation from each other when they are folded (or pleated) or while they are in use. It is preferable that the bonding is melt bonding, preferably accomplished by collecting melt-blown fibers directly on the air permeable fibrous sheet while the non-woven fabric is being made. Bonding using melt-blown fibers in this way is simple to perform.

Figure 2:
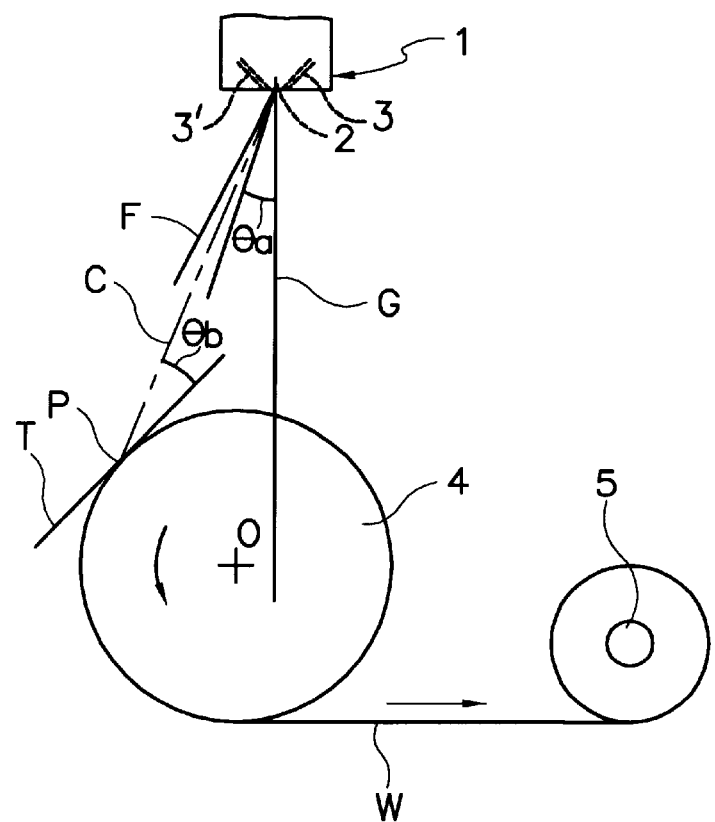
FIG. 2 is a schematic diagram showing a process for producing a nonwoven fabric embodying features of the present invention.

FIG. 2 is a schematic diagram showing a process of producing a nonwoven fabric according to the present invention.

In FIG. 2, a spinneret assembly 1 has a spinneret 2 having a multiplicity of aligned polymer delivery holes at the center thereof and nozzle slits 3,3' for introducing heated gas jets at both sides of the spinneret. A molten thermoplastic resin is extruded through each of the holes of the spinneret 2, and filaments are blown out of the spinneret by heated gas jetting from the nozzle slits 3,3', causing a flow of melt-blown fibers F.

A collecting drum 4 is provided downstream of the spinneret assembly 1. The flow of melt-blown fibers F is collected on the circumference of the drum 4 to form a nonwoven fabric W. The collecting drum 4 is shown as being positioned with its center of rotation O offset sidewardly with respect to the axis of the aligned holes of the spinneret 2. Adjacent to the collecting drum 4 is a winder 5 rotatably driven to take up the nonwoven fabric W formed on the collecting drum 4.

The spinneret 2 has on its surface a plurality of aligned and spaced-apart holes (FIG. 4) which are arranged along a straight line at intervals not larger than about 1.0 mm. The nozzle slits 3,3' are parallel to the lengthwise direction of arrangement of the holes. The heated gas jetting from the right nozzle slit 3 has a higher pressure than that jetting from the left nozzle slit 3'. This pressure difference is maintained preferably by designing the two nozzle slits to differ in width or jet pressure.

In the above-mentioned spinning apparatus, when a molten thermoplastic resin is extruded through the spinneret 2 at a comparatively large throughput and streams of heated gas are jetted from the respective nozzle slits 3,3' at different pressures with the pressure at 3 greater than the pressure at 3', the flow of melt-blown fibers F is deflected leftward as a main stream along the line C as shown in FIG. 2. The flow proceeds to the upper-left portion P of the collecting drum 4 in FIG. 2, and the melt-blown fibers are there collected on the surface of the collecting drum.

The closely arranged spinning holes in the spinneret 1, and the high polymer throughput provided, cause the melt-blown fibers F emerging from the spinneret to contact one another in space before they contact the drum 4. Further, the intentionally angularly inclined flow of the melt-blown fibers enhances the contact of the melt-blown fibers with one another, thereby forming a multiplicity of fiber bundles before they contact the drum 4.

For efficient bonding of fibers in space, it is necessary that the intervals between the aligned spinning holes of the spinneret be not more than about 1 mm, preferably not more than about 0.8 mm. The throughput should be not less than about 0.5 g/min/hole, preferably not less than about 0.7 g/min/hole. Further, the flow of melt-blown fibers F should be inclined such that the angle θa in FIG. 2 should be in the range of about 10–30 degrees between the center line C of the fiber flow and the axis line G of the holes of the spinneret 2.

If the intervals between spinning holes is more than about 1 mm, or if the polymer throughput is less than about 0.5 g/min/hole, it is difficult to form the desired nonwoven fabric in which fiber bundles account for at least about 50% of the total fibers. The upper limit of the throughput is preferably about 3 g/min/hole so as to ensure the desired fiber quality. The lower limit of the hole intervals is preferably about 0.2 mm so as to prevent the spinneret from being broken under pressure.

If the angle θa of FIG. 2 is smaller than about 10 degrees, it is too small to allow enough individual fibers to contact one another in space. On the other hand, if the angle θa becomes greater than about 30 degrees, the blown fibers acquire an unstable flow pattern and tend to produce unsatisfactory spinning.

The collecting drum 4 is positioned such that the center line C of the flow of melt-blown fibers F touches the collecting drum 4 at about the point P, with the touch angle θb being in the range of about 5–20 degrees, preferably about 5–15 degrees. The angle θb is defined as the angle between the center line C of the approaching path of melt-blown fibers and the tangent line T at point P (in other words, the angle at which the flow of melt-blown fibers F comes into contact with the drum).

Limitation of the angle θb is necessary because there is an air stream accompanying the melt-blown fibers F and such air stream is required to flow smoothly, without excessive turbulence, along the surface of the collecting drum 4. Such a smooth air flow permits the fiber bundles which have formed in the air space to be arrayed substantially in one direction (sheet machine direction) at the time of collection. If the drum touch angle θb is less than about 5 degrees it is difficult to collect melt-blown fibers F on the collecting drum 4 to form a nonwoven fabric; if greater than about 20 degrees the fiber bundles tend to scatter due to turbulence of the air flow around the collecting surface of the roll 4, which prevents regular arrangement of fibers substantially in one direction.

In order to minimize the turbulence of the air flow on the collecting surface of the roll 4 it is preferable not to use suction from the inside of the collecting drum 4. In addition, it is preferable that the collecting drum be clear of any object which will cause turbulence of the air flow on the collecting surface.

The fibers forming the fiber bundles have an average diameter not smaller than about 10 $\mu$m and not larger than about 50 $\mu$m, preferably larger than about 10 $\mu$m and not larger than about 30 $\mu$m. Fiber bundles composed of excessively thin fibers tend to drift away from the collecting drum 4 under the influence of the air stream because the touch angle θb is small. This disables the nonwoven fabric from forming on the collecting drum 4 or causes the fiber bundles to be undesirably twisted.

The collecting drum 4 is preferably positioned such that the distance between the spinneret 2 and the collecting surface of the roll 4 is in a range of about 30–90 cm, preferably about 40–70 cm, which is sufficient for the fibers adequately to undergo fusion-bonding in the air. The collecting drum 4 preferably has a smooth round surface so as to prevent disturbance on the surface of the nonwoven fabric. If the collecting drum has a flat surface, disturbance on the surface of the nonwoven fabric arises due to flow remaining after collecting the fibers on the surface of the nonwoven fabric. When the collecting drum has a smooth round surface the air stream is separated at an oblique angle from the surface of the nonwoven fabric as soon as the flow of melt-blown fibers comes into contact with the surface of the collecting drum 4.

Figure 3:
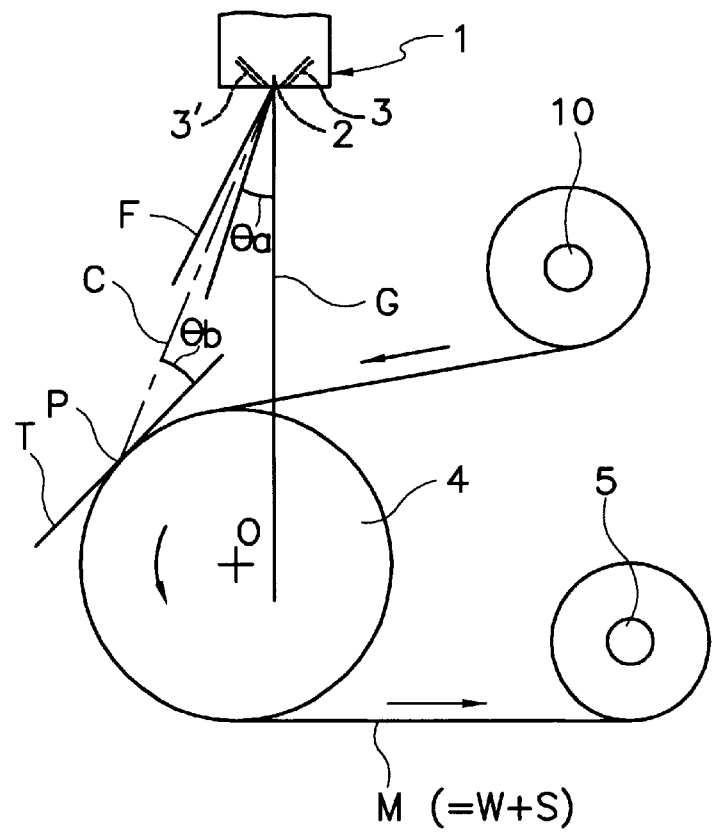
FIG. 3 is a schematic diagram showing a process for producing a filter medium embodying features of the present invention.

FIG. 3 shows a process for producing a filter medium, using a rollstock 10 of permeable fibrous sheet S which passes around the collecting drum 4 and goes to the winder 5. The nonwoven fabric W is formed on the sheets in the same manner as already described with reference to FIG. 2. The nonwoven fabric W thus formed immediately undergoes melt-bonding with the air permeable fibrous sheet S. In this way there is obtained a filter medium M, which is a combination of the nonwoven fabric W and the air permeable fibrous sheet S. The resulting filter medium is taken up by the winding machine 5.

The air permeable fibrous sheet S should have an air permeability of at least about 5 cc/cm$^2$/sec. In a preferred embodiment, it may be an electret nonwoven fabric, or more preferably it may be a melt-blown nonwoven fabric.

Figure 4:
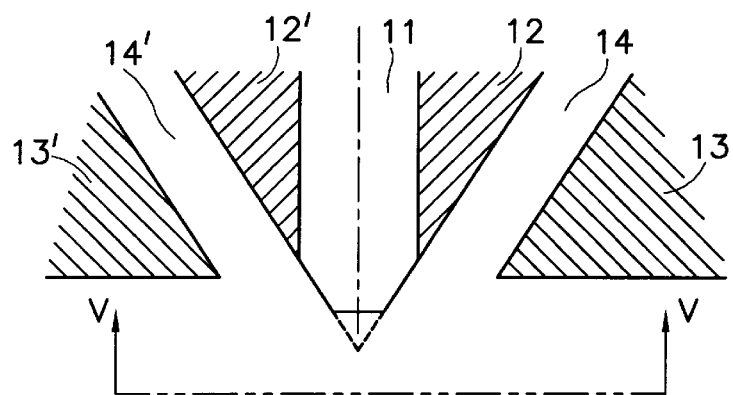
FIG. 4 is a side sectional view of one form of spinneret that is useful in the practice of this invention.
Figure 5:
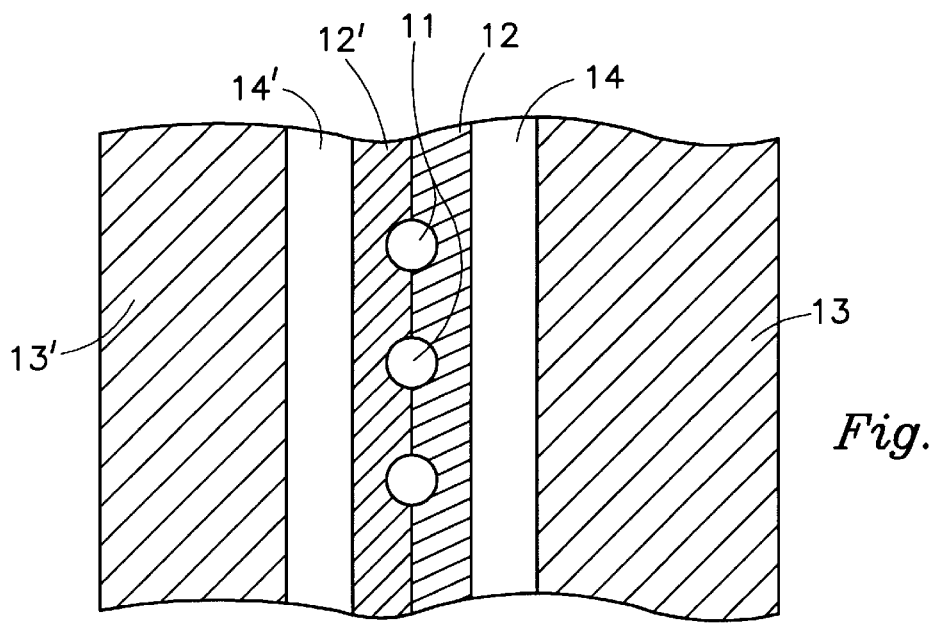
FIG. 5 is a bottom view of the spinneret, viewed as indicated by the line and arrows V—V which appear in FIG. 4.

FIGS. 4 and 5 show aligned spinneret holes 11 having longitudinal axes, and spinneret die nose portions 12,12' and lip portions 13,13' providing nozzle slits 14,14'.

To further illustrate the invention, and not by way of limitation, the following examples are given.

EXAMPLE 1

A nonwoven fabric, 0.78 mm thick, having a weight of 100 g/m$^2$, was prepared from polypropylene resin using an apparatus as shown in FIG. 2 under the following conditions.

The spinneret had holes arranged along a straight line row at intervals of 0.7 mm.
The heated air was jetted from two nozzle slits arranged left and right as in FIGS. 2 and 3 at pressures of 0.2 kg/cm$^2$ for slit 3' and 1.2 kg/cm$^2$ for slit 3.
The throughput of the molten polypropylene resin was 0.8 g/min/hole.
The angle θa between the center line of the flow of melt-blown fibers and the axis of the spinneret was 20 degrees.
The collecting position was 50 cm away from the spinneret.
The angle θb between the center line of the flow of melt-blown fibers and the tangent line T at the collecting position was 10 degrees.

The surface and cross section of the resulting nonwoven fabric were observed under a scanning electron microscope. It was found that the nonwoven fabric included fiber bundles formed by bonding a plurality of individual fibers, which accounted for 78% of all the fibers. The number of individual fibers constituting each fiber bundle was 2–20. The average diameter of the individual fibers was 15 $\mu$m. The average angle made by the fiber bundles with the sheet machine direction was 27 degrees.

The nonwoven fabric exhibited a bending resistance of 210 mm in the sheet machine direction when tested by the 45° cantilever method. In other words, it was found to be very stiff.

The nonwoven fabric permitted continuous pleating (50 mm high) at a rate of 40 folds per minute without cracking or breaking. The pleated nonwoven fabric showed uniform folds which were stiff and highly resistant to forces exerted on the crest.

EXAMPLE 2

A nonwoven fabric (as an air permeable fibrous sheet) having a weight of 15 g/m$^2$ and an air permeability of 37 cc/cm$^2$/sec was prepared by the ordinary melt-blown process from polypropylene fibers having an average fiber diameter of 1.3 $\mu$m. This nonwoven fabric was made into an electret at a rate of 15 m/min by exposure to corona discharge which was generated by a DC voltage of 40 kV applied across electrodes 6 cm apart.

The electret nonwoven fabric (as a filter medium) was found to be able to catch 97% of polystyrene particles (0–3 $\mu$m) at an air flow of 1.5 m/min.

Then, a nonwoven fabric was formed under the same conditions as in Example 1 from polypropylene fibers made by the melt-blown process of FIG. 3 on the electret nonwoven fabric which was fed by using the apparatus as shown in FIG. 3. Thus, there was obtained a laminate of melt-blown fiber bundles on the nonwoven fabric.

This laminate was found to have a weight of 115 g/m², a thickness of 0.89 mm, and a collecting efficiency of 96%.

In addition, it permitted continuous pleating under the same conditions as in Example 1 without cracking and breaking. The pleated specimen showed uniform folds which were stiff and highly resistant to the force exerted on the crest. It was suitable for use as a high-performance filter medium.

Comparative Example 1

A nonwoven fabric, 0.68 mm thick, having a weight of 100 g/m², was prepared from polypropylene resin using an apparatus specified below under the following conditions.
The spinneret had holes arranged in a row at intervals of 1.4 mm.
The heated air was jetted from two nozzle slits arranged left and right, at an equal pressure of 0.5 kg/cm².
The throughput of the molten polypropylene resin was 0.4 g/min/hole.
The flow of melt-blown fibers was directed perpendicularly to the surface of the collecting drum which was composed of 50-mesh wire net, and the inside of the collecting drum was sucked at −400 mmAq.
The collecting position was 50 cm away from the spinneret exit.

The surface and the cross section of the resulting nonwoven fabric were observed under a scanning electron microscope. It was found that the nonwoven fabric consisted substantially of scattered individual fibers. The few fiber bundles accounted for only 5% of all the fibers. The average diameter of the individual fibers was 16 μm. The average angle made by the individual fibers (which were not arranged in one direction but were randomly scattered) with the sheet machine direction was 47 degrees.

The resulting nonwoven fabric exhibited a bending resistance of 95 mm in the sheet machine direction. During pleating (50 mm high) under the same conditions as in Example 1, the sheet broke due to friction with the folding blade, and provided folds having irregular heights and intervals. The resulting pleated sample was so weak as to be crushed easily under pressure that was applied to the crest.

Comparative Example 2

A nonwoven fabric was formed under the same conditions as in Comparative Example 1 from polypropylene by the melt-blown process on the same nonwoven fabric (not electret) as used in Example 2 which was fed continuously to the collecting drum used in Comparative Example 1. Thus there was obtained a laminate of nonwoven fabrics.

The nonwoven fabric used for lamination in Example 2 had a collecting efficiency of only 38%. The final laminate of this Comparative Example 2 was found to have a weight of 115 g/m², a thickness of 0.78 mm, and a collecting efficiency of only 41%.

During pleating (50 mm high) under the same conditions as described in Example 1, the fabric broke or cracked at crests and its folds had irregular heights and intervals. The resulting pleated sample was so weak as to be crushed easily when pressure was applied to the crest.

EXAMPLE 3

A nonwoven fabric, 0.45 mm thick, having a weight of 60 g/m², was prepared from polypropylene resin using an apparatus as shown in FIG. 2 of the drawings under the following conditions.
The spinneret had holes arranged in a row at intervals of 1.0 mm.
The heated air was jetted from the left and right-hand nozzle slits at pressures of 0.2 kg/cm² and 0.7 kg/cm², respectively.
The throughput of the molten polypropylene resin was 0.6 g/min/hole.
The angle θa between the center line of the flow of melt-blown fibers and the axis of the spinneret was 10 degrees.
The collecting position was 40 cm away from the spinneret.
The angle θb between the center line of the flow of melt-blown fibers and the tangent line T at the collecting position was 20 degrees.

The surface and cross section of the resulting nonwoven fabric were observed under a scanning electron microscope. It was found that the nonwoven fabric included fiber bundles formed by bonding a plurality of individual fibers, which comprised 60% of all the fibers. The number of individual fibers constituting each fiber bundle was 2–20. The average diameter of the individual fibers was 22 μm. The average angle made by the fiber bundles with the sheet machine direction was 33 degrees.

The nonwoven fabric thus produced exhibited a bending resistance of 165 mm in the sheet machine direction. In other words, it was found to be very stiff. The nonwoven fabric permitted continuous pleating (30 mm high) at a rate of 30 folds per minute without cracking or breaking. The pleated nonwoven fabric showed uniform folds which were stiff and highly resistant to forces that were exerted on the crest.

EXAMPLE 4

A nonwoven fabric (as an air permeable fibrous sheet) having a weight of 30 g/m² and an air permeability of 65 cc/cm²/sec was prepared using an ordinary melt-blown process from polypropylene fibers having an average diameter of 3 μm. This nonwoven fabric was made into an electret at a rate of 15 m/min by exposure of the fabric to a corona discharge generated by a DC voltage of 40 kV applied across electrodes 6 cm apart.

The electret nonwoven fabric (as a filter medium) was found to have a collecting efficiency of 86%.

Then, a nonwoven fabric was formed under the same conditions as in Example 3 from polypropylene applied by melt-blowing on the electret nonwoven fabric, which was fed by using the same apparatus as used in Example 3. This produced a laminate of nonwoven fabrics having a weight of 90 g/m², a thickness of 0.65 mm, and a particle collecting efficiency of 86%.

In addition it permitted continuous, uniform pleating under the same conditions as in Example 3. The pleated specimen was highly suitable for use as a high-performance filter medium.

EXAMPLE 5

A nonwoven fabric, 1.20 mm thick, having a weight of 150 g/m², was prepared from polypropylene resin using an apparatus as shown in FIG. 2 of the drawings, under the following conditions.
The spinneret had holes arranged in a row at intervals of 1.0 mm.
The heated air was jetted from the left and right nozzle slits at a pressure of 0.25 kg/cm² and 0.9 kg/cm², respectively.
The throughput of the molten polypropylene resin was 0.6 g/min/hole.

The angle θa between the center line of the flow of melt-blown fibers and the axis of the spinneret was 15 degrees. The collecting position was 70 cm away from the spinneret. The angle θb between the center line of the flow of melt-blown fibers and the tangent line T at the collecting position is 15 degrees.

The surface and cross section of the resulting nonwoven fabric were observed under a scanning electron microscope. It was found that the nonwoven fabric included fiber bundles formed by bonding a plurality of individual fibers in an amount of 69% of all the fibers. The number of individual fibers constituting fiber bundles was 2–20. The average diameter of the individual fibers was 12 μm. The average angle made by the fiber bundles with the sheet machine direction was 30 degrees.

The nonwoven fabric exhibited a bending resistance of 290 mm in the sheet machine direction. In other words, it was found to be very stiff. When tested for filtration performance, it exhibited a pressure loss of 0.22 mmAq for polystyrene particles (0.3 μm in diameter) at an air flow velocity of 1.5 m/min, with a collecting efficiency of 25%.

The nonwoven fabric permitted continuous pleating (150 mm high) without cracking and breaking. The pleated nonwoven fabric showed uniform folds which were stiff and highly resistant to forces that were exerted on the crest.

Comparative Example 3

A nonwoven fabric, 0.44 mm thick, having a weight 60 g/m², was prepared using the same apparatus as used in Example 3, with the operating conditions modified as follows.

The heated air was jetted from the left and right nozzle slits at a pressure of 0.3 kg/cm² and 0.4 kg/cm², respectively. The angle θa between the center line of the flow of melt-blown fibers and the spinneret axis was 5 degrees. The collecting position was 40 cm away from the spinneret. The angle θb between the center line of the flow of melt-blown fibers and the tangent at the collecting position was 30 degrees.

The surface and cross section of the resulting nonwoven fabric were observed under a scanning electron microscope. It was found that the nonwoven fabric included fiber bundles formed by bonding a plurality of individual fibers, which amounted to 45% of all the fibers. The number of individual fibers constituting each fiber bundle was 2–20. The average diameter of the individual fibers was 20 μm. The average angle made by the fiber bundles with the sheet machine direction was 38 degrees. The nonwoven fabric exhibited a bending resistance of 115 mm in the sheet machine direction.

The product permitted pleating only at a low rate of 15 folds per minute. The resulting folds were irregular and so weak to be deformed under pressure that was exerted on the crest.

Comparative Example 4

The same procedure as in Comparative Example 3 was repeated except that the angle θb was changed to 60 degrees. Thus there was obtained a nonwoven fabric, 0.42 mm thick, having a weight of 60 g/m². Microscopic observation revealed that it included fiber bundles in an amount of 24% of all the fibers. The average diameter of the individual fibers was 23 μm. The average angle made by the fiber bundles with. the sheet machine direction was 43 degrees. The bending resistance was 80 mm in the sheet machine direction.

Pleating was possible only at a low rate of 15 folds per minute. The resulting folds were more irregular than those in Comparative Example 3 and so weak as to be deformed under the pressure that was exerted on the crest.

Comparative Example 5

A nonwoven fabric, 0.51 mm thick, having a weight of 60 g/m² was prepared in the same manner as in Example 3 except that the throughput was changed to 0.4 g/min/hole.

The average diameter of the individual fibers was 7 μm. The amount of fiber bundles was 45% of all the fibers. The average angle of fiber bundles to the sheet machine direction was 36 degrees. The bending resistance in the sheet machine direction was 125 mm.

This nonwoven fabric underwent pleating (30 mm high) at a rate of 30 folds per minute. It became fuzzy due to friction with the folding blade, and the resulting folds were irregular in shape and weak. The fabric was not suitable for use as a filter medium.

Comparative Example 6

The same procedure as in Example 3 was repeated except that the throughput was changed to 0.2 g/min/hole. It was impossible to collect individual fibers on the collection drum because they were blown away by the jet air stream. The average diameter of the individual fibers was 3 μm.

What is claimed is:

1. A filter medium in the form of a laminate comprising a permeable nonwoven fabric comprising a multiplicity of individual fibers arranged as bundles, and adhered to one another, wherein at least numerically 50% of all the fibers that are present in the entire nonwoven fabric are present in the form of fiber bundles in which a plurality of individual fibers are bonded together, wherein said fiber bundles are arranged generally regularly through the thickness of said fabric and substantially in the same direction and wherein substantially all of said fiber bundles are arranged at a direction substantially within an angle in the range of about ±35 degrees with respect to said same direction bonded to an air permeable fibrous sheet having an air permeability of at least 5 cc/mm²/sec.

2. A filter medium according to claim 1, wherein said nonwoven fabric and said air permeable fibrous sheet are melt bonded.

3. A filter medium according to claim 1, wherein at least either said nonwoven fabric or said air permeable fibrous sheet is an electret.

4. A filter device in which a filter medium according to claim 1 in which said filter medium is pleated.

5. A filter device in which a filter medium according to claim 2 in which said filter medium is subjected to a pleating operation.

6. A filter device in which a filter medium according to claim 3 comprises pleats.

7. A filter device in which a permeable nonwoven fabric comprising a multiplicity of individual fibers arranged as bundles, and adhered to one another, wherein at least numerically 50% of all the fibers that are present in the entire nonwoven fabric are present in the form of fiber bundles in which a plurality of individual fibers are bonded together, wherein said fiber bundles are arranged generally regularly through the thickness of said fabric and substantially in the same direction and wherein substantially all of said fiber bundles are arranged at a direction substantially within an angle in the range of about ±35 degrees with respect to said same direction is provided in pleated form.

8. A permeable nonwoven fabric comprising a multiplicity of individual fibers arranged as bundles comprising about 2–20 individual fibers, said bundles being adhered to one another, wherein at least numerically 50% of all the fibers that are present in the entire nonwoven fabric are present in the form of fiber bundles in which a plurality of individual fibers are bonded together, wherein said fiber bundles are arranged substantially in the same direction and wherein substantially all of said fiber bundles are arranged at a direction substantially within an angle in the range of about ±35 degrees with respect to said same direction.

9. A permeable nonwoven fabric comprising a multiplicity of individual fibers arranged as bundles, and adhered to one another, formed by melt-blowing on a machine that is continuously running in a given direction, and wherein said fiber bundles are arranged in substantially said given direction, wherein at least numerically 50% of all the fibers that are present in the entire nonwoven fabric are present in the form of fiber bundles in which a plurality of individual fibers are bonded together, wherein said fiber bundles are arranged substantially in the same direction and wherein substantially all of said fiber bundles are arranged at a direction substantially within an angle in the range of about ±35 degrees with respect to said same direction.

* * * * *